June 10, 1930.  L. A. JONES ET AL  1,762,925
SOUND FILM WITH SENSITOMETRIC SCALE
Filed May 1, 1929   2 Sheets-Sheet 1
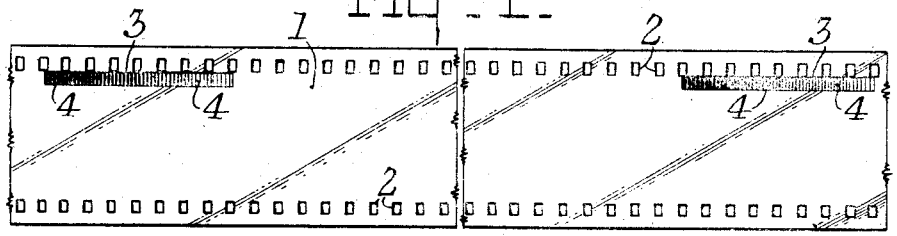
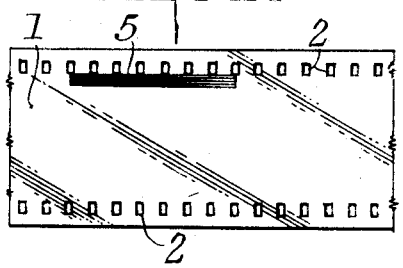 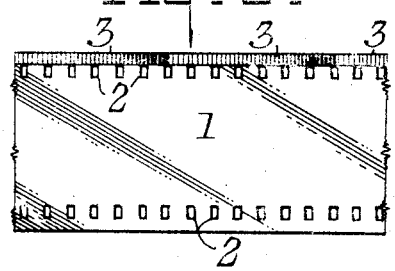
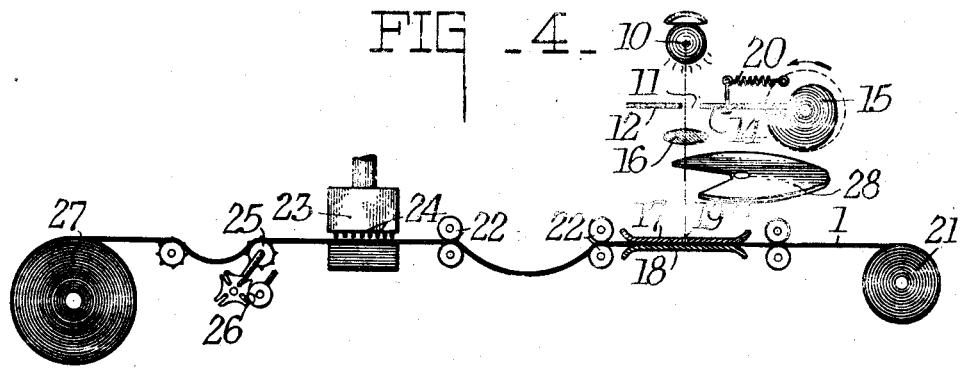
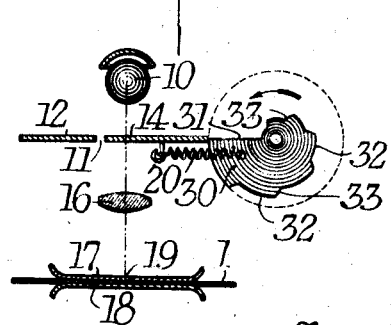
Inventors
Loyd A. Jones,
Clifton M. Tuttle.
By Newton M. Perrin
Attorney June 10, 1930.  L. A. JONES ET AL  1,762,925
SOUND FILM WITH SENSITOMETRIC SCALE
Filed May 1, 1929   2 Sheets-Sheet 2
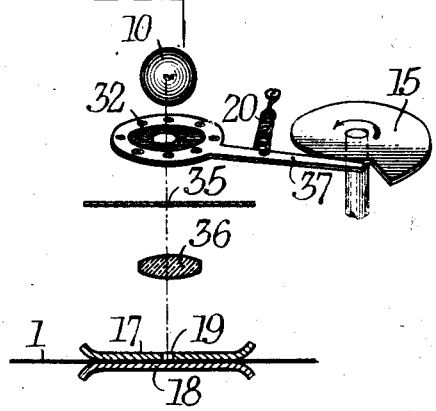
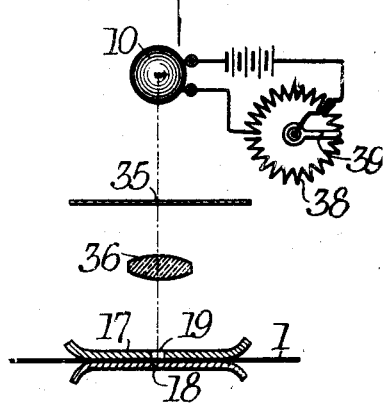
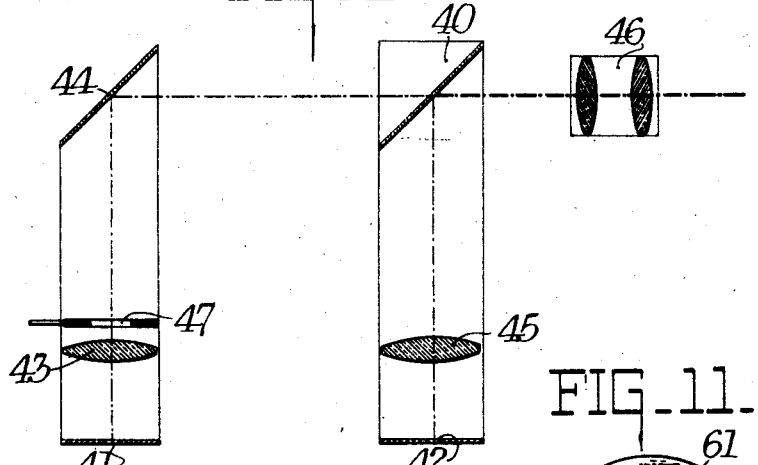
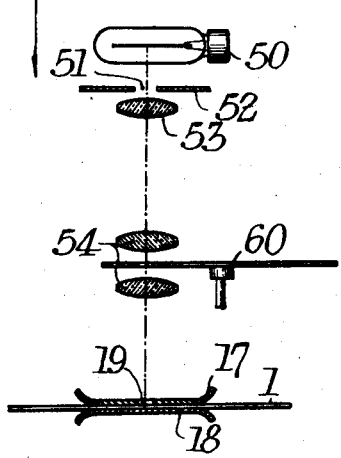
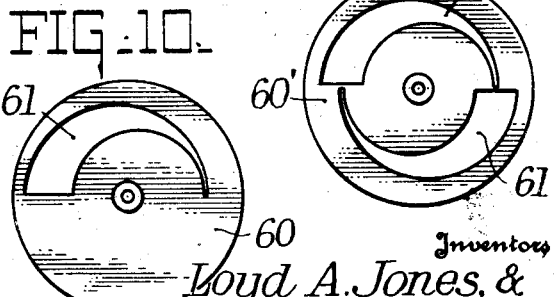
Inventors
Loyd A. Jones, &
Clifton M. Tuttle,
By Newton M. Perriss
Attorney Patented June 10, 1930

1,762,925

UNITED STATES PATENT OFFICE

LOYD A. JONES AND CLIFTON M. TUTTLE, OF ROCHESTER, NEW YORK, ASSIGNORS TO EASTMAN KODAK COMPANY, OF ROCHESTER, NEW YORK, A CORPORATION OF NEW YORK

SOUND FILM WITH SENSITOMETRIC SCALE

Application filed May 1, 1929. Serial No. 359,634.

This invention relates to photographically sensitized film and particularly to such film adapted for the recording of sound records.

It relates especially to such film in the form of a perforated band similar to that used for motion picture purposes and having on it the latent images of density wedges or scales which are to be developed up with the image of the sound record. Our invention relates to improvements in this type of film, to the method of producing the latent images and to the method of their use.

In the photographic recording of sound to accompany motion pictures, present practice requires a knowledge of the extent of development to which the negative has been subjected. Those skilled in the art are familiar with the fact that the development accorded to the positive must bear a definite relation to that which has been accorded to the negative.

Present practice of the finishing laboratory makes use of so-called sensitometric strips containing graded series of exposures impressed on the photographic material for which it is desired to know the subsequent treatment. Such strips are attached to the negative and developed together with this negative. After development, the densities of the steps are read with a suitable instrument; the data is then plotted and the determination of the extent of development is made in terms of gamma—the density differential of log .10 of exposure.

Difficulties of the present system which our invention is intended to minimize are as follows:

1. During processing and subsequent cutting and assembly, the sensitometric strips may become detached from the original negative. The loss of such a strip or that of the corresponding value of gamma occasions great difficulty in making the positive.

2. Unless a number of strips are made and attached at intervals throughout the length of the negative, the data will be of questionable value since uniformity of development is difficult to attain.

3. Because of the failure of the reciprocity law with all photographic materials, sensitometric strips should be made under conditions of intensity and time closely approximating those obtaining in the actual exposure of the negative sound track. The high intensity and short exposure time is difficult to attain in the type of sensitometer used in the processing laboratories.

4. Taking of the data and plotting the curve under present conditions are laborious and consume more time than is desirable.

Our invention comprises:

1. The idea of impressing the latent image of the sensitometric exposure at intervals throughout the length of the film used in making the negative.

2. Means for impressing the exposure on the film under conditions of time and intensity approximating those of practice in making the negative.

3. Means for readily determining the value of the constant gamma, without the necessity of plotting data.

Reference will now be made to the accompanying drawings wherein the same reference characters denote the same parts throughout; and in which Figs. 1, 2 and 3 show different forms of our invention applied to film.

Figs. 4, 5, 6 and 7 are diagrammatic showings of printers for making the sensitometric images on the film.

Fig. 8 is a diagrammatic showing of an instrument used in our invention.

Fig. 9 is a diagram showing another form of printer.

Figs. 10 and 11, are face views of alternative forms of shutter discs usable in the system shown in Fig. 9.

In each of the figures the film is denoted by 1 and has along its borders perforations 2 which, at the time of manufacture, are spaced and shaped very accurately and uniformly. At intervals along the film are latent images of sensitometric strips which when developed appear as shown in the several figures. In Fig. 1 the sensitometric strip 3 appears as a series of areas 4 of uniform densities; the whole series being graded, and there being an area for each perforation. This scale may and preferably is printed at the perforator and the steps are accurately and definitely located with respect to the perforations. As here shown, the division lines between consecutive steps is registered with the middle points of perforations but this is not a necessary relation.

In Fig. 2 is shown a sensitometric strip 5 uniformly and gradually graded from end to end, but the gradation is such that there is a uniform ratio of exposure between two points separated by the distance between corresponding points of two successive perforations.

In Fig. 3, the strips 3 are placed end to end, continuously, instead of at spaced intervals as in Fig. 1. In this figure the boundaries between successive areas register with the ends of perforations instead of their middle points. The sensitometric areas are also outside of the perforations. Such a film may be used for sound, for pictures or for both.

The sensitometric strips may be printed by any of several methods. An entire strip may be printed by contact through a suitable optical wedge or step density tablet, the film being moved between exposures and stopped while the exposure is impressed. The film may be drawn at a uniform speed past a slit of continuously varying width. Such a printer is shown diagrammatically in Fig. 4, wherein a light source is indicated at 10, in front of this being the slit 11, between a fixed plate 12 and a plate 14 pressed by spring 20 toward the right and moved by logarithmic cam 15 toward the left. The image of slit 11 is projected by lens 16 on the film 1 as it passes between the guides 17 and 18, past the printing position behind slit 19 in guide 17. The film 1 is drawn from the supply roll 21 and propelled by friction drive rolls 22 through the printing station to the perforator 23 where the perforating dies 24, which are accurately made and positioned form perforations in the film. Sprocket 25 which is intermittently driven, as by the Geneva gear mechanism 26, moves the film intermittently through the perforator and is wound up on reel 27. A shutter disc 28 rotates in a multiple timed relation with cam 14. This disc has an exposure opening 29 therein. The speed of the shutter and width of the opening 29 are so calculated that there is projected one complete density wedge due to a single revolution of cam 14. A strip such as is shown in Fig. 2 will be produced. It is to be understood that all the various mechanisms are accurately formed and the driving mechanisms connected for accurated timed relation. As the actual mechanical connections are of a usual type, a complete showing of them would obscure rather than clarify the invention.

Fig. 5 shows a modification of a portion of Fig. 4, in that the cam 30 is of a step type instead of a continuous curve, each step being concentric with the axis, but the steps 32 as a series being logarithmic in their radial distance from the axis and separated by inclined edges 33. An inclined portion 31 restores the member 13 to starting position. A strip such as shown in Fig. 3 will be produced. By making the sensitometric strip exposures as a part of the same operation as the perforating, the film cannot have altered in its dimension between the operations. By accurately adjusting and controlling the mechanism the strips will have the dimensional relation described.

Still another modification is shown in Fig. 6, wherein an iris diaphragm 32 is placed between the light 10 and the fixed slit 35, the image of which is projected by lens 36 on film 1. The diaphragm control lever 37 is operated by spring 20 and cam 15 as in Fig. 4. Still another method of control is shown in Fig. 7 where the lamp 10 is in series with a resistance 38 with a rotating arm 39. The resistance is so evaluated that as the arm rotates the light thrown by the lamp 10 through the fixed slit 35 varies logarithmetically.

We wish to emphasize further the desirability of these strips being printed under conditions approximating those under which the film will be used. In making sound records the standard cine film usually passes at the rate of ninety feet per minute past an exposure slot about .001 inches wide. In printing we therefore approximate the same conditions. It has been found that, due to failure of the reciprocity law, equal total exposures differing in intensity and duration do not produce the same densities and we overcome this cause of error by making the exposure as described.

In order to utilize most efficiently the film having exactly placed sensitometric strips, we examine the developed strip directly with an instrument by which may be read at once the difference in density between two points thereon at a predetermined distance apart.

Under the printing conditions described, any such two prints separated by a fixed distance should when developed be possessed of a constant density difference, if they be on the straight line portion of the Hurter and Duffield characteristic curve.

In Fig. 8 is shown diagrammatically a simple instrument having a photometer head 40, to which light is directed from two slots 41 and 42 separated by a definite distance, lens 43 and mirror 44 directing one beam and lens 45 the other. The photometer head is viewed through eye piece 46. The fields may be balanced for equality of field brightness by diaphragm 47. In order to allow for shrinkage of the film the instrument will be set for any particular reading with difference between the slots equal to the distance corresponding edges of a definite number of perforations 2. The developer sensitometric strip will then be examined and the reading will give at once the desired data. In reading a strip of the step type, it is not necessary to adjust the instrument exactly. The instrument may be calibrated in terms of "gamma" for use with strips of a known space-exposure relationship.

In the form of printer shown in Fig. 9, 50 is a lamp with a ribbon type of filament, from which light passes through the manually adjustable slit 51 between plates 52, and the lens 53 thereat. The image of the lens 52, illuminated by slit 51 is projected by the lens systems 54 on the sensitive film 1 as it passes between guides 17 and 18 and behind slit 19. Between the components of objective 54 rotates a disc shutter 60 or 60', carrying one or more tapered curved slots 61 as shown in Figs. 10 and 11.

There is thus produced on the film a uniformly varied density wedge. If the disc 60 is used, this wedge will be repeated, the intervening space approximating the length of the sensitometric strip. If disc 60' is used, the space between successive strips will be negligible. By varying the speed of relative movement of the shutter and film, and the dimensions of the curved slots 61 any desired dimensions of the resulting printed strip may be obtained.

It is to be noted that the curved slots 61 do not at their narrow ends quite reach a point but terminate bluntly at a point such that the resulting printed wedge will represent the straight line portion of the characteristic H and D curve of the sensitive material.

When we refer to the use of the film in sound reproduction it is to be understood that we mean by the term "reproduction" the entire process including the recording of the sound on a sensitive film, printing or duplicating the record thus produced on a second film, and the production of sound from either the first or second film.

It is further to be understood that we contemplate as included in our invention all such modifications and equivalents as fall within the terms of the appended claims.

Having thus described our invention, what we claim as new and desire to secure by Letters Patent is:

1. A band of sensitized film having thereon at intervals throughout its length latent images of sensitometric strips, and having a longitudinal series of exactly spaced perforations, each sensitometric strip image varying in exposure longitudinally of the band in an accurate dimensional relation to the perforations.

2. A band of sensitized material intended particularly for use in the reproduction of sound by a method including the passing of the strip at a known speed past an illuminated slot, said band having thereon a series of latent images of sensitometric strips varying in exposure and produced by passing said band at said known speed past an illuminated slot.

3. A band of sensitized material intended particularly for use in the reproduction of sound by a method including the passing of the strip at a known speed past an illuminated slot, said band having thereon a series of latent images of sensitometric strips varying in exposure and produced by passing said band at said known speed past an illuminated slot of the same order of magnitude as is used in the sound recording method.

4. The method of impressing the latent image of a sensitometric strip on a film band intended for use in a sound process involving the passing of said band at a predetermined speed past an illuminated slot that comprises passing said band past an illuminated slot at substantially said predetermined speed and varying the light falling on the film from said slot.

5. The method of impressing the latent image of a sensitometric strip on a film band intended for use in a sound process involving the passing of said band at a predetermined speed past an illuminated slot that comprises passing said band past an illuminated slot at substantially said predetermined speed and varying the light falling on the film from said slot, the dimensions of the slot being of the same order of magnitude of those used in the sound reproduction process.

Signed at Rochester, New York, this 20 day of April, 1929.

LOYD A. JONES.
CLIFTON M. TUTTLE.